Sept. 3, 1968 H. A. BRADT Re. 26,449
PROCESS FOR SEPARATION OF LIQUID FROM LIQUID-SOLID MIXTURES OF FINE SOLID PARTICLE SIZE
Original Filed May 22, 1957
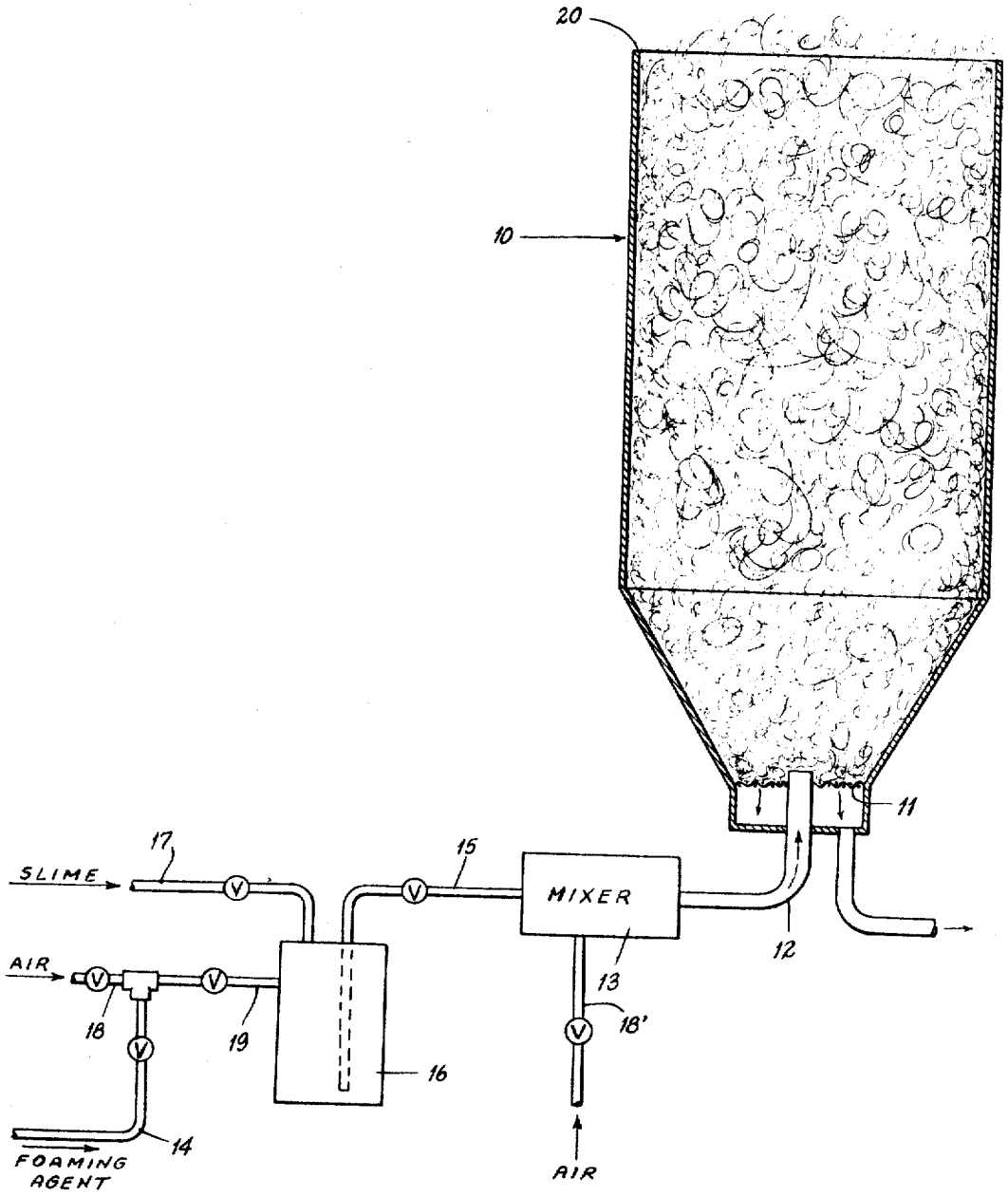
INVENTOR:
HORACE A. BRADT,
BY Kingsland, Rogers & Ezell
ATTORNEY United States Patent Office Re. 26,449
Reissued Sept. 3, 1968

26,449

PROCESS FOR SEPARATION OF LIQUID FROM LIQUID-SOLID MIXTURES OF FINE SOLID PARTICLE SIZE

Horace A. Bradt, St. Louis, Mo., assignor to St. Louis Shipbuilding-Federal Barge, Inc., St. Louis, Mo., a corporation of Missouri Original No. 3,053,761, dated Sept. 11, 1962, Ser. No. 660,872, May 22, 1957. Application for reissue Aug. 27, 1964, Ser. No. 405,314

8 Claims. (Cl. 210—44)

Matter enclosed in heavy brackets [ ] appears in the original patent but forms no part of this reissue specification; matter printed in italics indicates the additions made by reissue.

This invention relates to improvements in separation of liquid from solids and in particular is concerned with the removal of liquid from colloidal types of liquid-solid mixtures. This invention finds special advantage in the dewatering and drying of phosphate slimes and other colloidal slimes which have presented various and serious problems in consolidating the solids and in clarification of the liquid.

In the past, colloidal slurries or slimes containing suspended solids of very small particle size have been quite difficult to dewater properly. A number of methods and applications have been employed with the use of filters, centrifuges, decantation systems and other gravity settling procedures. However, due to the finely divided nature of the suspended solids which may be in the form of colloidal suspensions, gels, or other finely divided and thoroughly dispersed mixtures, resistance to fast separation of the solids from the liquids has been encountered. When such slimes and slurries are attempted to be separated by filtration, clogging of the filter is a very serious problem. In settling by gravity or decantation, the settling is extremely slow and sometimes completely ineffective.

A particular problem has existed in the handling of phosphate slimes which are a principal by-product of the pebble phosphate mining process. These slimes have been conventionally consolidated in settling ponds beyond the limit of compaction by gravity settling alone, if the conditions are favorable for surface evaporation and bottom seepage, but such settling of the slime, which is composed of from 95 to 97% water, takes a considerable length of time and requires a large amount of space and tie-up of material. Further, the dry produce ultimately obtained is in the form of a hard cake and is required to be broken up for further handling and treatment and is not consistent in make up from top to bottom.

By means of this invention, a process has been devised for the rapid drying of slimes and slurries comprised of solids of small particle size of colloidal nature. As a very signal feature of this invention, the slime to be dried is mixed or agitated to the form of a foam through the use of foaming agents either as originally contained in the mixture or as added as part of the process. This foam may be suspended over a draining medium for the drainage of water which is subsequently released from the foam. It might be considered that a form of filtration in this process resembling a non-pressure filter is employed and the foam film holds the solids in suspension and the liquid runs out by gravity. The liquid is easily released from the solids while the foam keeps the solids from clogging the foam supporting member which may be in the form of a filter screen, packed sand, a drainboard, or the like.

In this invention, it might be considered that the foam provides for the drainage of water by gravity around the discrete bubble particles in the foam. Thus, although the foam may be whipped into a liquid-solid mixture, so that the foam formed in solids form a self supporting structure, the excess water may run down and drain by gravity. In the formation of the foam, the type of foam i.e., the bubble size, the foaming agent and the volume of expansion may be varied to suit the type of slurry or slime employed.

The foam produced by this invention is in stable form. This is to say that the foam does not run and is non-flowing, and, when placed upon a support, maintains its form without any substantially slumping or breakdown. The foam is further prepared from all of the liquid and all of the solids in the solid-liquid suspension, and when foamed the foam maintains its stability while liquid drains from the foam to provide for liquid separation. Further, the foam maintains its stability during drying, such as air drying, such that when dried there is solid material produced that has a large number of small openings conforming to the bubble size in the foam which the solid material is prepared. The openings are in the form of cells so that the material finally prepared from the foam is, in the dry form, a collapsible solid mass.

Although the foamed solid liquid mixture has had a substantial amount of liquid drained from it, the foam film may be further processed in several different manners. First of all, the foam film may be exposed to the atmosphere, in sun light, in an air stream, or to heat for a period of time for ultimate drying. The ultimate product will be in the form of a fairly light dry crumbly mass, which may then be crumbled, rather than crushed to a powder with the particle size remaining relatively unchanged from that of the original suspended sizes. As another embodiment, the substantially dried foam may be collected in paste form before it dries completely, or may be extruded to any desired form. As still another modification, the foamed particles may be included with previously dried discrete material in the form of a fine powder and when coated, the foamed particles will dry much faster as the dry powder seems to absorb moisture very rapidly. In all modifications, the dewatering and subsequent drying is accomplished in far less time, than when the product is not foamed.

Accordingly, it is the primary object of this invention to obtain a solids separation from a mixture of liquids and finely divided solids by causing the formation of a foam thereof, either by adding a foaming agent thereto, or by utilizing any foaming properties already contained in the mixture to cause a formation of a foam and separating the liquid therefrom.

Another object of this invention is to separate liquid from solid material in a slime or slurry of combined liquids and solids which are difficulty separable through the use of a foaming process by foaming the slime or slurry and draining the liquid from the foamed material through a porous base mamber in the form of a screen filter or like manner.

A further object of this invention is to separate liquid from difficultly filterable slimes through the use of a foaming process to form a foamed slime and then to drain the liquid from the foamed slime and dry the remaining particles to a honeycombed solid structure which is easily crumbled.

Still another object of this invention is to provide a method for separating liquid from solids in the form of slime by providing a foaming process for the slime to cause it to obtain the form of a foamed slime and to drain the water from the foamed slime and form a resultant partially dried foamed material in selected particle sizes by pugging, pelleting and the like.

Yet a further object of this invention is to separate solids from a liquid-solid slime mixture by adding a foaming agent or aerating the mixture to convert it to a foamed condition to drain the water therefrom and cause the coating of discrete particle sizes of the foam with a fine dried material in the form of a powder to further the drying of the foamed particles.

Still another object of this invention is to provide a continuous process for separating liquid from a liquid-solid slime mixture by converting the slime to a foam, through the use of a foaming process and charging it to the bottom of a tower and draining water from the bottom of the foamed slime through a base member and continually adding freshly foamed slime material to the bottom of the tower to cause the drained foam to rise within the tower for ultimate removal from the top in a continuous fashion.

Yet another object of this invention is to dry phosphate slimes by the addition of a foaming agent to cause the production of foamed phosphate slime and to separate liquid therefrom and to produce an ultimately dried solid phosphate material in the form of a dried honeycombed structure.

Further objects of this invention will appear in the detailed description which follows and will be further apparent to those skilled in the art.

For the illustration of this invention, particular reference will be made to the drying of phosphate slimes. The drawing illustrates apparatus for carrying out a continuous process for such drying for the purpose of example. It is, however, to be understood and as described above that this invention is of broader application and may be used for the foamed drying of slimes in other fields. Thus, any difficultly filterable material in the form of a slime or colloidal or gelatinous state may be treated according to this invention for the liquid-solid separation. Thus, the invention may be used for liquid-solid separation in the brewery industry where such liquid-solid mixtures are conventionally encountered. The invention is of broad aspect for the ultimate reclamation of either a desired liquid or a desired solid from the liquid-solid mixture, depending upon which is the economically recoverable component.

In the mechanics of the liquid separation from the liquid-solid foamed mixture, it is believed that the air bubbles or cells formed by the use of the foaming agent, provide an external film that serves as a medium for trapping solids, but at the same time provides a path to carry off the liquid. Thus, the foam film holds the solids in suspension and the liquid runs out by gravity to the bottom and through a supporting base member which may be either in the form of a filter screen, packed sand or the liquid may run down slanting run-off boards for removal of the liquid. The important consideration is that the foam suspends the solids and keeps them from clogging the foam supporting member. For purpose of convenience in description the foam supporting member may be described as a filter screen but is to be understood as to include other draining members.

In the practice of this invention enough foam through the use of a foaming agent, employed either in a pre-foamed mix or added directly to the slime, or by utilizing any foaming properties already in the mix, is whipped or agitated with the liquid-solid mixture of the slime so that the foam film and the solid film form a self-supporting structure after the excess water has drained out by gravity. The amount of the foaming agent and the type of foam formed in relation to bubble size and duration of the foam life, can be changed to suit the type of slime and the consistency of the slime, as will be understood. After the excess water has drained, the moisture left in the solid and foam film is sufficient to make a heavy putty if the material is collected and this may be pugged before it dries. On the other hand the foamed structure can be made to retain its shape until it dries. It can then be crumbled into a powder as its structure is that of a honeycombed easily crumbled material. Both stages of the dewatering of the excess liquid and the subsequent drying are used for this type of finally dried product and are accomplished in far less time than if the foam had not been formed. In the pugging step only the initial dewatering of the excess liquid from the foam is employed.

In order to explain the invention, reference will be made below to particular applications of the invention with phosphate slimes. It will, however, be understood that other applications may be used. As an example of other applications besides phosphate slime drying, the separation of the difficultly filterable trub derived from wort in the brewing industry may be obtained by practice of this invention. The process may be used in the treatment of coal washing slurries, or the slurries from desliming operations in processing metallic ores or from industrial mineral milling, or the slurries that are produced in processing non-metallic minerals and powdered rocks production such as are used commercially as pigments, fillers, etc.

The phosphate slimes are quite difficultly filterable or decantable and the conventional practice of drying to date has been most cumbersome. A standard practice of such drying of phosphate slime for the recovery of the solid phosphate material requires the usage of large settling pits in the ground necessitating a great deal of space and a long time of settling. The reclaimed solid material finds usefulness in the manufacture of lightweight aggregate or in other cementitious products for use in the construction industry, or for use as a fertilizer, rubber conditioner, fillers, as a phosphate charge for electric furnaces, as a raw material in the production of phosphoric acid and its byproducts, etc.

In the instant invention, such phosphate slimes which contain 95 to 97% water may be foamed through the use of various types of foaming agents. Conventional foaming agents employed in the concrete industry include: the synthetic detergents such as sodium lauryl sulfate, alkyl aryl sulfonate and other types; resin soap and vegetable or animal glue; saponin; alkylated naphthalene sulfonate and degenerated glue, butylated naphthalene sulfonate and waterglass, and isopropylated naphthalene sulfonate and calcium chloride or high alumina cement; proprietary neutralized resin; hydrolyzed protein such as keratin (hoof and horn meal), cattle hooves and fish scales, blood and saponin, and casein. It will be readily understood that various different types of foaming agents may be employed depending upon the slime used and the form of the dried product desired.

In the use of the foaming agents above-described to provide the foamed slime for the draining of the liquid, it should be pointed out that mere flotation and aeration of the slime does not give the desired results. In flotation and aeration processes air bubbles are formed which carry the solids to the top. In trying this method of foaming slimes, it has been found that this is unsatisfactory and does not provide for the proper liquid drainage as the foam soon breaks down and does not drain properly.

For the further explanation of this invention, there are listed below a number of examples illustrating the separation of liquid from foamed phosphate slimes. The phosphate slimes used are those from the Florida field in which the percentages of the various components upon a dry basis are within the following ranges:

| | Dry basis percent |
|---|---|
| Loss on ignition (combined water) | 9 to 12 |
| Phosphoric acid ($P_2O_5$) | 6 to 15 |
| Iron oxide ($Fe_2O_3$) | 2 to 7 |
| Alumina ($Al_2O_3$) | 18 to 29 |
| Lime (CaO) | 17 to 19 |
| Magnesia (MgO) | 0.80 to 1.30 |
| Silica ($SiO_2$) | 30 to 32 |
| Fluorine ($F_2$) | 0.20 to 1.00 |
| Alkalies ($Na_2O$) | 0.30 to 0.40 |

Example I

The phosphate slime comprising 95 to 97% water was mixed with a foaming agent which was prefoamed. This foaming agent was a hydrolized protein typified by Mearl type P foaming agent obtained from the Mearl Manufacturing Corporation of Roselle Park, New Jersey. The agent was prefoamed by agitation and then added to the slime in a power mixer. Enough foam was introduced to increase the volume of slime to four or five times the original volume. The mixing was carried out for a half minute or so until a thorough mixing was obtained. Alternatively the foaming agent may be added directly to the slime without prefoaming, but it has been found that more foaming agent is required than in the former method. Where the foaming agent is added directly, the mixture obtained is relatively more fluid and may be poured, but still has standup strength.

After the procedure above outlined, the foamed mixture was placed over a fiberglass cloth of 16 mesh. After standing for a short period of time, clear water came through and was recovered, but none of the foamed mass came through. After drainage of one hour, roughly one-third of the original volume of the slime was lost in the form of clear water. The foamed slime, after the removal by drainage of most of the liquid, may be permitted to stand and dry in the atmosphere. Drying in the sun substantially hastens the complete drying and the final dried slime will be of a cellular structure. This material is very easily crumbled which may be done by taking part of the material and crumbling it between the fingers of the hand as an example of its physical makeup. The final drying is not by drainage of liquid through the screen member, but is by evaporation to the atmosphere and the retention of the filmlike structure accounts for the cellular or honeycomb structure.

By comparison, the same slime dried in a pit without drainage will stay wet almost indefinitely. Also, if the slime is attempted to be drained through the screen without the foaming as above described, a substantial percentage of the slime will actually pass through the screen and will eventually clog it to resist further separation. In present commercial procedures, water may be decanted from the slime pits, and this water may be reused in other applications. However, the amount of water reclaimed will never be as much as that reclaimed in the process of this invention. Also, in the decanting operation, if this is carried out daily on the same slime, the residue will ultimately become fairly thick and after a week or so will be in the form of mud and finally a wet cake which dries to hard mass.

The ultimately dried structure obtained through the use of the process of this invention for the phosphate slime, by drying in the atmosphere, provides a product having very small air cells. The material when crumbled between the fingers is in the form of a light powder which is light enough to blow away. It is to be pointed out that various foaming agents and the type of mixing may be varied to provide larger air cells and to provide bigger granules, as will be well understood. Likewise, air or inert gases may be forced into the mixer where the foaming agent and the slime are mixed together to modify the cell structure. Also, the foaming agent may be varied to provide a foam more in the form of a paste with rapid drainage of the water and breaking of the bubbles before the slime is dry enough to have a complete cellular structure. This may be desired for other purposes, such as for pelleting or pugging.

Example II

A process similar to Example I was carried out to the point where the foamed phosphate slime was permitted to drain the excess liquid. After this major drainage had been accomplished, the foamy residue was placed on the top of a tray covered with a bed of previously completely dried slime material in the form of a powder. The tray was tilted, and the slime particles rolled down and coated themselves somewhat in the nature of breaded oysters. This coating prevented the particles from sticking to material handling surfaces and provided for ready handling. The coated mass of particles of slime was then placed on two pieces of asbestos board. One board was dried in the sun at a temperature of 90° F. and 70% humidity and in the space of two and one-half hours' time dried to a material which was readily crumbled. The other board was dried indoors out of exposure with the sun and was completely dried in a space of five hours. The foamed material left upon the screen was dry within a period of two days, showing the advantages of drying by coating liquid drained slime with previously dried material.

It has further been observed that the dried slimes processed according to this invention are of uniform color. This is of substantial advantage, when compared to the conventional slime drying and crushing of the pit material which is streaked in color indicating separation of constituents, and is thereby quite undesirable for some applications. As further advantages over the dried cake from the pit slimes and over and above the undesirable requirement of crushing the cake in mechanical crushers or by bulldozers or the like, the evaporation is greatly speeded up by the process of this invention. The particle size of the dried slime product of this invention is quite small and the product is in the form of a powder where desired, as compared to quite substantially larger fragments of the crushed caked material from the settling pits. The dried powder of the product of this invention presumably results from the separation of the original slime particles, rather than from a conglomeration as in the pit-dried cake material.

Where desired, however, the processed slime of this invention may not be carried to a dried powder form. After the drainage of the liquid from the foamed slime, this may be converted in physical form in a pug mill or pelleting apparatus, and pellets and briquettes may be formed or extruded like any other plastic material.

In the drying of the partially dried slime, coated with previously dried phosphate material in the form of a powder, it is believed that drying is hastened by absorption of moisture from within the slime through the dried coating. This is apparently all out of proportion to the amount of the coating employed and may be due to the increased surface of exposure caused by the coated material. This is an observed result aside from any theoretical discussion to which applicant does not desire to be limited. It has further been found that the coated partially drained foam will dry by evaporation or even by further liquid drainage much faster than from the simple method of Example I, where the foam is merely exposed to the atmosphere.

Example III

As a further example of the rapid drainage of liquid foamed phosphate slime, the following process was carried out. Foamed phosphate slime was placed in a five quart oil can cut out at both the bottom and top and the can was filled over a bottom screen to a depth of twelve inches. After one hour the enveloping can was removed, and it was found that the drainage had been substantially completed and that the foamed slime retained its expanded mass upon the screen. As a means for comparison in the same type of apparatus, the can was filled to a depth of two and one-half inches, and it was found that the time for drainage and retention of the foamed mass was about the same. In the drainage of the liquid, there may be shrinkage which depends upon the type of foaming agent employed to obtain the foamed slime. Where the foam film remains long enough for the excess liquid to run off, the foam cells formed are of substantial duration and less shrinkage will be encountered. Thus, the modification of the physical construction of the foamed slime to produce the foam obtained by the particular foaming agent is an important consequence of this invention. This modification of the circumstances is well understood in the art where foaming agents are quite well predictable upon their known performances.

Example IV

The process of this invention may be used to obtain dried slimes in a continuous manner. In the single figure of this invention, an apparatus for carrying out such a process is generally indicated by the reference numeral 10. This apparatus is in the form of a tank that may be as much as sixty feet in height. The tank is provided with a filter screen 11 at the bottom for the drainage of liquid therethrough. The tank has an inlet tube 12 and is connected to a mixer 13 shown in schematic form, to which a foaming agent may be charged together with slime through a line 15. The slime is added to the foaming agent in a pre-mixer 16 through a conduit 17, while the foaming agent from the line 14 with air or other inert compressed gas from the conduit 18 are added to the pre-mixer through the conduit 19. In this process, the foaming agent, which may be either prefoamed or added as the agent, per se, is charged with the slime in conduit 15 to the mixer and mixed to a foamed slime. If desired, air may be added from the line 18' to the mixer 13 for additional foaming. The foamed slime is then charged through the conduit 12 to the tower and the tower is filled to the top 20.

As the liquid is separated from the foamed slime by drainage through the screen 11, further foamed material may continually be added to the tank through the conduit 12. This foamed material being of heavier mass than the partially dried foamed slime will cause the partially dried foam to rise and the material on the top of the tank may then be taken off for recovery. This continuous process based upon the gravity differential of the dried foam with respect to the initial premixed foams saturated with liquid, provides a very convenient method for the first stage drying of the foamed slime. After the drainage of liquid, the foamed slime taken from the top of the tank may be either further dried to the ultimate honeycomb form by exposure to the atmosphere, sunlight, or to any type of evaporation procedure desired, or may be breaded with previously dried material as described above. Also, the foamed product may be pugged wherein the air is driven off. The foam then disappears and the product becomes a putty and is handled thereafter the same as any plastic material which is extruded or molded.

As will be well understood the foamed slime from the mixer 13 may be charged to the tank through the use of pumps and the like in the execution of this process. As a further aid in the continuity of this continuous process, it will be observed that there is some shrinkage of the partially dried and liquid drained foam as it rises within the tank. A low hydrostatic head is employed due to the low massive weight of the liquid drained foam which aids in the process.

Example V

As a further example of the adaptability of this process, clay may be dried. Florida clay obtained from the bottom of Estero Bay and including sand and shell material was screened through a number 30 mesh screen to remove the shells and coarse materials. This clay was washed with fresh water two to three times and was then decanted in a vessel to remove the muddy water from the sand. The remaining clay slurry will settle in water in contrast to the phosphate slimes. However, this invention finds advantage in the settling and dewatering of the muddy water slurry. Thus, the clay slurry was foamed by the use of a foaming agent in the manner described in Example I and water was drained out much faster than where no foaming of the slurry was employed. The same results have been observed with Vermont clay which does not contain the shell of the Estero Bay clay but does contain a substantial amount of sand.

In these experiments, it has been observed that where cement, sand or silica flour or other matters are present in the slime or slurry, water runs out faster from the foam. The nature of the material quite definitely affects the rate of water release, and as observed above in Example V the water release from clay slurry is quite rapid as compared to the phosphate slimes.

Example VI

As a further example of the adaptability of this process, expanded mica, commonly known as Zonolite, has been treated according to the process of this invention to retard moisture absorption. Such Zonolite or vermiculite is commonly mixed with clay to form facing tile, etc., in which moisture absorption is disadvatageous. It has been found that these materials, when coated with the foamed slimes of this invention and subsequently fired, provide a product that is impervious to water.

As a contrast to the use of foamed slimes, Zonolite particles were mixed with an unfoamed slime so that they were fairly well coated and the mixture was then dried. This provided a hard undesirably brittle material which when broken would break the particles of Zonolite.

When treated by the teaching of this invention, it was found that Zonolite could be mixed with the phosphate slime and foamed through the use of a foaming agent. The foamed material was then screened and water was rapidly drained off to give a dry product of the original size particles with a phosphate coating. This is useful for the production of lightweight concrete, ceramic products etc., as it is quite light and non-hygroscopic when fired, which is a very advantageous characteristic.

There has been described above a process for very conveniently separating liquid from solids in slimy, gelatinous, or colloidal mixtures which are normally quite difficult to separate. In the past, the separation of such very difficultly filterable materials has been quite a problem in the use of conventional screens, filters, decanters and the like. The teaching of this invention makes possible the separation of such liquids and solids to provide the desired end product in variable forms. The invention has been described to provide a broad teaching for liquid solid separation. Although it has been found that particular suitability exists in the field of drying of phosphate slimes as described above and in the brewing industry, other applications will be quite readily apparent as indicated in various portions of this description.

Various changes and modifications will be apparent to those skilled in the art. Such changes and modifications are within the teaching of this invention as defined by the claims appended hereto.

What is claimed is:

1. A process for separating dimensionally stable solid discrete matter and liquid matter out of a liquid slurry suspension of the solid matter and wherein said liquid slurry suspension is an aqueous slurry containing solid inorganic particles, comprising: adding a foaming agent to the liquid suspension, agitating the mass thus produced until a single self-supporting stable non-flowing foamy mass of small bubble size sufficient to maintain the stability of the foam is formed from all of the liquid and the solid matter and in which the foamy mass comprises a film containing the solid particles in discrete form, *placing the foam on a supporting surface* and thereafter draining the major portion of the liquid in substantially solid free form from the solids of the foamy mass *and from said supporting surface* to provide a foamy mass containing discrete solid particles *and passing the drained liquid from said surface to a clarified liquid receiving means.*

2. A process for drying dimensionally stable solid discrete matter in a liquid-solid mixture containing the solid matter, comprising: adding a foaming agent to the liquid-solid mixture, agitating the mass thus produced until a single self-supporting stable non-flowing foamy mass of small bubble size sufficient for stability of the foam until air dried is formed from all of the liquid and the solid matters and in which the foamy mass comprises a film containing the solid particles in discrete form, thereafter *removing liquid by at least partially* draining a major portion of the liquid in substantially solid free form from the foam, and finally drying the foam in stable form to produce a dry, cellular, collapsible frangible solid mass containing solid particles in discrete form.

3. The process of claim 2 wherein the foam comprises a mass of liquid and solids permeated by tiny bubbles, the solids being evenly distributed therethrough, and wherein *there is a step of* [the] liquid draining *comprising* [comprises] supporting the mass on a filter and causing the liquid to drain through the filter, the density of the foam supporting the solids above the filter as the liquid descends through and away from the foam, so that the solids do not descend upon the filter in mass to clog the same.

4. The process of claim 2, wherein the foamy mass [from which liquid has been drained and] which is partly wet, is broken into small parts and is intimately mixed with a powder, so that the particles are coated with the dried powder and air drying the same.

5. A process for separating solid discrete matter and liquid matter out of a liquid slurry suspension of the solid matter and wherein said liquid slurry suspension is an aqueous slurry containing solid inorganic particles, comprising: adding a foaming agent to the liquid suspension, agitating the mass thus produced until a single self-supporting stable nonflowing foamy mass of small bubble size sufficient for stability of the foam until air dried is formed from all of the liquid and the solid matters and in which the foamy mass comprises a film containing the solid particles in discrete form, *placing the foam on a supporting surface* thereafter draining a major portion of the liquid in substantially solid free form from the foam *and from said supporting surface and passing the drained liquid from said surface to a clarified liquid receiving means,* and finally drying the foam in *a* stable form to produce a dry, cellular, collapsible frangible solid mass containing solid particles in discrete form.

6. The process of claim 5 wherein the original material is a phosphate slime, and expanded mica is introduced into the initial material and foamed and dried therewith, to make a dried product consisting of mica having a phosphate coating.

7. The process of claim 5 wherein the liquid slurry suspension is an aqueous phosphate slime.

*8. A dry cellular collapsible frangible solid mass containing solid particles in discrete form prepared by the process of claim 2.*

References Cited

The following references, cited by the Examiner, are of record in the patented file of this patent or the original patent.

UNITED STATES PATENTS

| | | | |
|---|---|---|---|
| 737,099 | 8/1903 | Hall. | |
| 1,064,773 | 6/1912 | Richter. | |
| 1,430,182 | 9/1922 | Peck. | |
| 1,439,061 | 12/1922 | Broadbridge et al. | |
| 1,738,906 | 12/1929 | Kirschbraun. | |
| 1,777,945 | 10/1930 | Untiedt. | |
| 1,782,383 | 11/1930 | Greider | 106—122 XR |
| 1,963,030 | 6/1934 | Powell | 106—40 XR |
| 2,162,379 | 6/1939 | Dole et al. | |
| 2,562,646 | 7/1951 | Sharp et al. | |
| 2,725,985 | 12/1955 | Howard et al. | |
| 2,729,334 | 1/1956 | Schwarz et al. | |
| 2,778,499 | 1/1957 | Chamberlain et al. | |
| 2,800,459 | 7/1957 | Dijksman et al. | |

FOREIGN PATENTS

| | | |
|---|---|---|
| 741,085 | 1/1953 | Great Britain. |
| 118,668 | 9/1918 | Great Britain. |

MICHAEL E. ROGERS, *Primary Examiner.*